(12) United States Patent
Krueger et al.

(10) Patent No.: US 12,098,937 B2
(45) Date of Patent: Sep. 24, 2024

(54) MEASURING CHANNEL AND PROCESS FOR SPATIALLY ARRANGING A SENSOR COMPONENT OR SENSOR ARRAY IN A MEASURING CHANNEL

(71) Applicant: Samson Aktiengesellschaft, Frankfurt am Main (DE)

(72) Inventors: Marcel Krueger, Schoeneck (DE); Michael Merscher, Roedermark (DE); Gaetano Richter, Maintal (DE); Sebastian Krause, Bruchkoebel (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 309 days.

(21) Appl. No.: 17/104,825

(22) Filed: Nov. 25, 2020

(65) Prior Publication Data

US 2021/0164817 A1 Jun. 3, 2021

(30) Foreign Application Priority Data

Nov. 29, 2019 (DE) .......................... 102019132552.8

(51) Int. Cl.
  *G01F 1/66* (2022.01)
  *F16K 37/00* (2006.01)
  *G01N 9/00* (2006.01)

(52) U.S. Cl.
  CPC ............ *G01F 1/662* (2013.01); *F16K 37/005* (2013.01); *G01N 9/00* (2013.01)

(58) Field of Classification Search
  CPC .......... G01F 1/662; G01F 1/663; G01F 1/667; G01F 23/296; G01F 1/66; G01F 25/10;
  (Continued)

(56) References Cited

U.S. PATENT DOCUMENTS

| 4,024,760 A * | 5/1977 | Estrada, Jr. ............... | G01F 1/66 73/861.31 |
| 6,895,823 B1 * | 5/2005 | Herrmann ............... | G01F 1/662 73/861.23 |

(Continued)

FOREIGN PATENT DOCUMENTS

| DE | 102013105407 A1 | 11/2014 |
| EP | 0639776 A1 | 2/1995 |

(Continued)

OTHER PUBLICATIONS

German action dated Sep. 7, 2020, Application No. 10 2019 132 552.8.

*Primary Examiner* — Giovanni Astacio-Oquendo
*Assistant Examiner* — Martin Walter Braunlich
(74) *Attorney, Agent, or Firm* — Banner & Witcoff Ltd.

(57) ABSTRACT

In a method for spatially arranging at least one sensor array in a measuring channel, a predetermined desired geometry of the measuring channel is provided; a desired sensor-array arrangement associated with the desired geometry of the measuring channel is provided, where the sensor-array arrangement includes spatially-defined positioning parameters and orienting parameters in regard to the sensor components; an actual geometry of the measuring channel is captured; it is determined if a positioning parameter or an orienting parameter is outside of an admissible value range in relation to the actual geometry of the measuring channel, and the at least two sensor components of the sensor array are arranged in the measuring channel according to a most-current desired-sensor-array arrangement.

25 Claims, 5 Drawing Sheets

Figure 1:
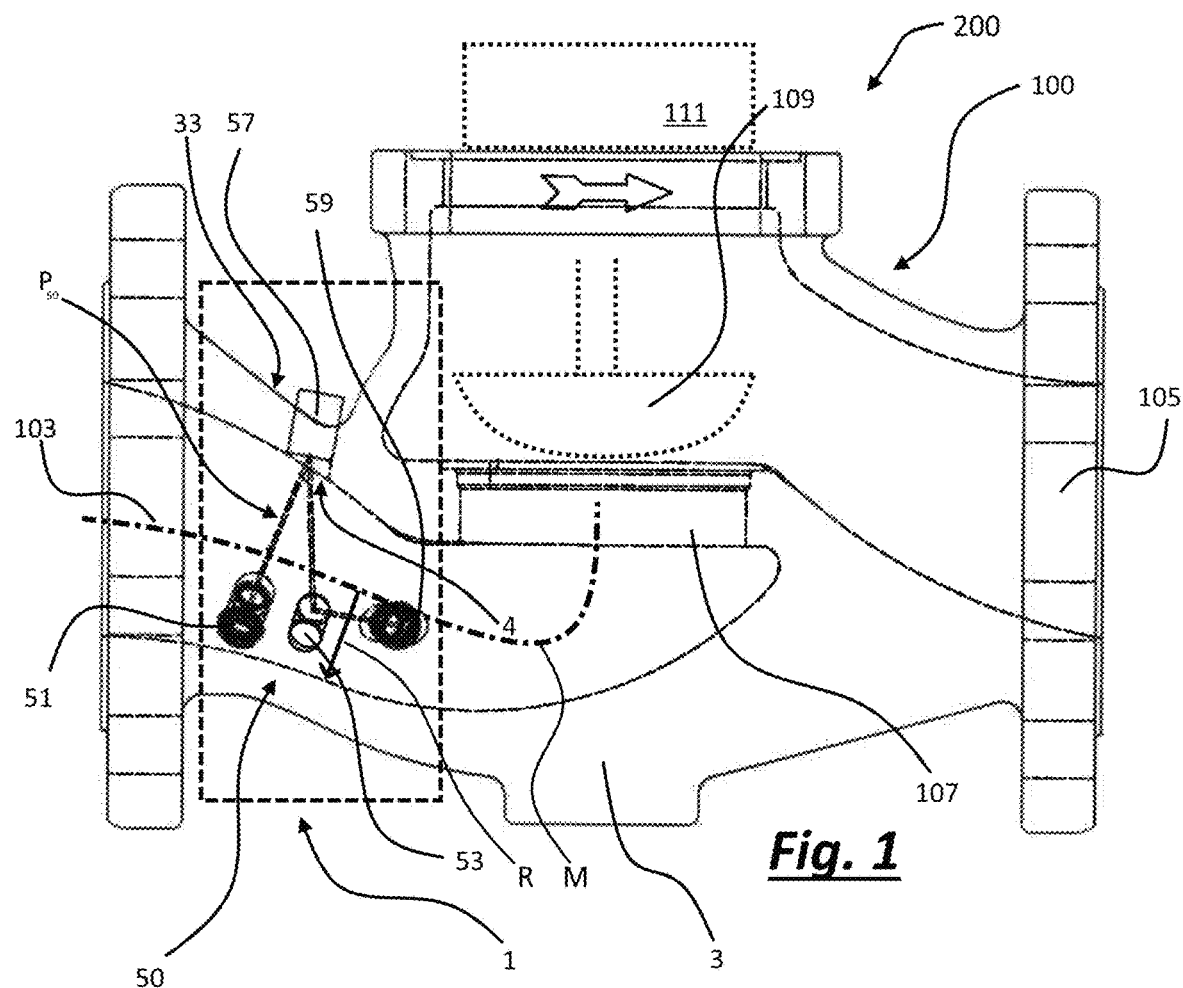

(58) Field of Classification Search
CPC . G01F 5/00; G01F 15/00; G01N 2291/02836; G01N 9/00; G01P 5/245; E03B 7/072; F17D 5/06; F16K 37/005
See application file for complete search history.

(56) References Cited

U.S. PATENT DOCUMENTS

| | | | |
|---|---|---|---|
| 7,706,986 B2* | 4/2010 | Frohlich | G01N 29/032 73/861.31 |
| 8,141,434 B2* | 3/2012 | Kippersund | G01F 1/662 73/861.28 |
| 8,490,498 B2 | 7/2013 | Wiest et al. | |
| 8,875,587 B2* | 11/2014 | Wiest | G01F 1/663 73/861.28 |
| 11,885,654 B2* | 1/2024 | Boer | F16K 37/0091 |
| 2006/0059999 A1 | 3/2006 | Feller | |
| 2008/0188986 A1* | 8/2008 | Hoppe | B25J 9/1692 901/41 |
| 2016/0116316 A1* | 4/2016 | Kissling | G01F 1/667 73/861.25 |
| 2018/0156651 A1 | 6/2018 | Schulz et al. | |
| 2018/0306617 A1* | 10/2018 | Bonomi | G01F 1/663 |
| 2019/0368908 A1* | 12/2019 | Aughton | G01F 1/667 |

FOREIGN PATENT DOCUMENTS

| | | |
|---|---|---|
| EP | 1378727 B1 | 11/2005 |
| EP | 2278280 A1 | 1/2011 |
| KR | 1020100001900 A | 1/2010 |
| WO | 2016025919 A1 | 2/2016 |
| WO | 2018132870 A1 | 7/2018 |

\* cited by examiner

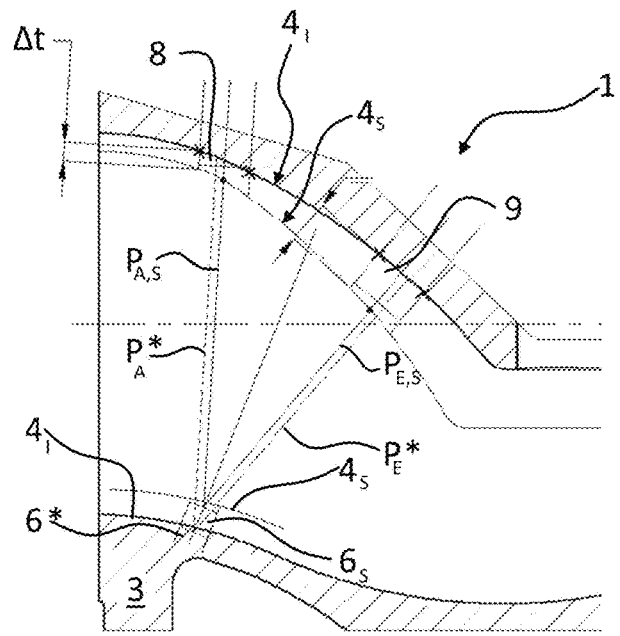
*Fig. 6*
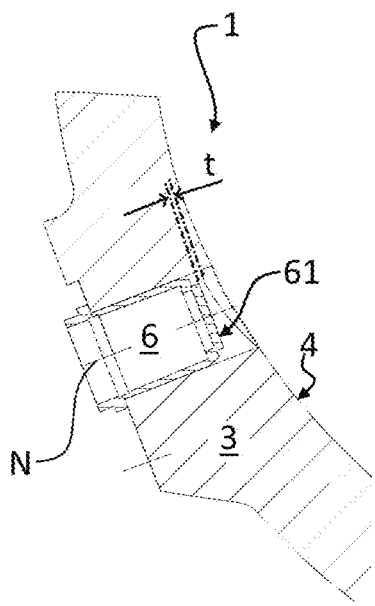 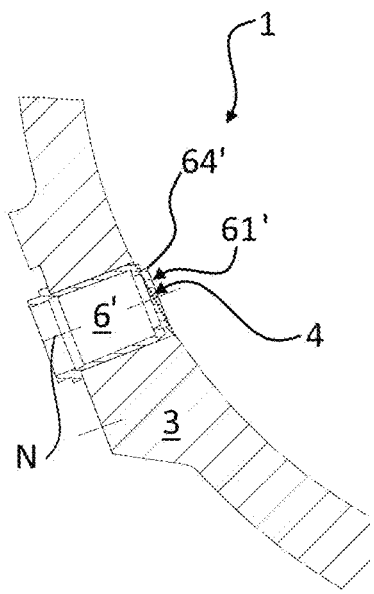 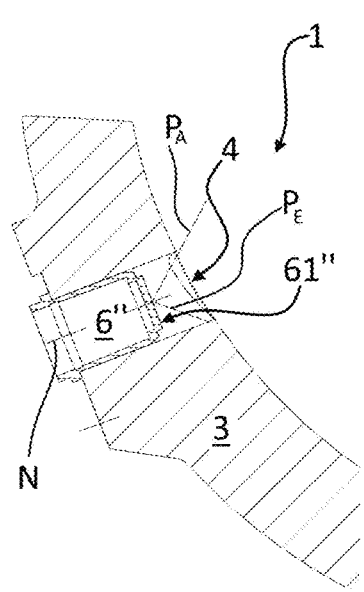
*Fig 7a*  *Fig. 7b*  *Fig. 7c*

MEASURING CHANNEL AND PROCESS FOR SPATIALLY ARRANGING A SENSOR COMPONENT OR SENSOR ARRAY IN A MEASURING CHANNEL

CROSS REFERENCE TO RELATED APPLICATIONS

This patent application claims priority to German Patent Application No. 10 2019 132 552.8, filed Nov. 29, 2019, which is incorporated herein by reference in its entirety.

BACKGROUND

Field

The disclosure is directed to a process for spatially arranging at least one sensor component in a measuring channel, as well as a corresponding measuring channel.

Related Art

Measuring channels for processing fluid of processing plants are generally known. Such measuring channels are equipped with sensor components for capturing one measurement or several measurements of the processing fluid. A measurement of the processing fluid can for example be flow velocity, density, density-gradient, volume flow, mass flow, temperature, pressure, particularly dynamic pressure or static pressure, or the like.

For a known measuring channel, it is common for all sensor components to at least sectionally project into the interior of the channel through which processing fluid passes. Such sensors may for example measure the pressure, the temperature or the throughflow of a processing medium. However, the projecting sensor components disturb the process fluid flow and may cause inhomogeneous flow conditions which detrimentally affect the measuring precision. This is problematic in particular when the sensor component is provided for detecting a measurement regarding the fluid kinematics of the processing fluid. Measurements regarding the fluid kinematics are measurements related to the movement of the processing fluid, for example flow velocity, volume flow or mass flow.

A measuring channel with a sensor component for detecting measurements regarding fluid kinematics of the processing fluid is for example described in EP 0 639 776 A1. In the measuring channel according to EP 0 639 776 A1, several ultrasonic sensors are arranged in a rectilinear, cylindrical measuring channel as active sensor components as well as possibly mirrors as a passive sensor components for determining the processing fluid velocity dependent upon direction and orientation. In the measuring channel, an average processing fluid flow velocity and/or processing fluid throughflow can be determined on the basis of the travel time difference of sonic waves transferred between sensors on the one hand in the direction of the flow and on the other hand against of the direction of the flow. For a predetermined processing fluid, the propagation speed of the sonic waves in a stationary fluid is known. Sonic waves moving with the fluid flow have a correspondingly increased velocity whereas sonic waves traveling against the processing fluid flow have a correspondingly decreased velocity. According to EP 0 639 776 A1, an average flow velocity in longitudinal direction can be determined for example with a sensor array in longitudinal direction of the channel. Furthermore, with a second sensor array having sensor components distributed in the circumferential direction of the channel, it can be detected which velocity the processing fluid has in the flow direction.

A prerequisite for precise measurements can be a precise positioning of a sensor component in relation to the body of the measuring channel. Special requirements are made for measuring channels in which multiple sensor components are sectionally grouped in pairs or in groups of more than three as an interacting sensor array. Normally, the orientation of the sensor components of the sensor array in relation to one another is optimized to the detriment of the positioning of the individual sensor components in relation to the measuring channel. The arrangement of the sensor components relative to one another is imperative for the sensor array to function properly.

As can be understood from EP 0 639 776 A1, it is usual to employ sensor components having an elongated cylinder shape and an effective sensor surface. The measuring channel according to EP 0 639 776 A1 can be manufactured with simple bores extending in the radial direction into the measuring channel, which extend towards the middle of the channel. The sensor components are fit axially into the bores and project into the channel as can be seen for example in FIG. 4a. The projection, the position or penetration depth of the respective sensor component, and the rotation of the effective surface in relation to the longitudinal axis of the sensor, that is: the orientation of the sensor component, are cumbersome configured during manual assembly, such that the sensor components are aligned correctly with respect to one another. However, measurement imprecisions are caused by the sensor components projecting into the channel.

Reliable flow measurements are also difficult to obtain when the flow channel in which the measurements are to be made is curved. For example, a measuring channel may form an entry area of the control valve. As for example described in European patent application with the official file number EP 19 179 100.3 with the filing date Jan. 21, 2019, for such channel geometries having a change in flow direction through a channel curvature and/or through a change of channel cross-section, it has been shown to be appropriate to employ sensors acting in opposite circumferential directions. The sensor array may use a common passive sensor component in the form of a reflector. In order to obtain good measurement results in the complicated channel geometry and under the consequently difficult flow conditions, the housing of the measurement channel or control valve is usually manufactured to very precise tolerance requirements. Thus, control valves may be manufactured to such a precision that a wall section acts as a passive reflector sensor component. However, the expenditure for the conventional manufacturing and assembly is exceedingly high. Usually, one or several reference planes have to be made highly precise in relation to one another. On the basis of usually to or three plane reference surfaces spatially orthogonal with respect to one another, a well-defined spatial geometry may be determined. On the basis of the spatial geometry, receptions for the active and/or passive sensor elements are introduced or the channel section is post-processed. The very high costs of such a manufacturing method have so far prevented precise measurements of processing fluid parameters particularly in complex flow geometries to be established in processing technology.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
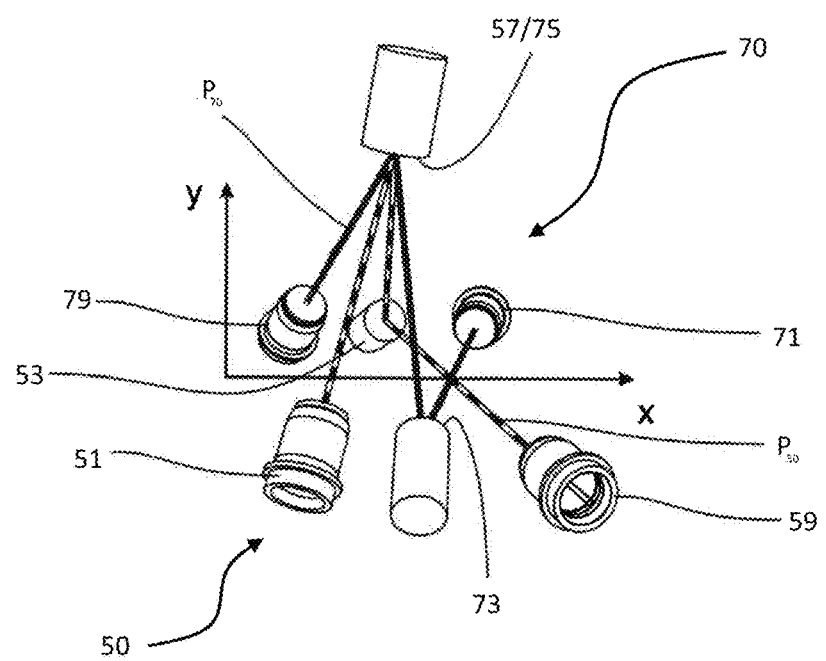
Figure 3:
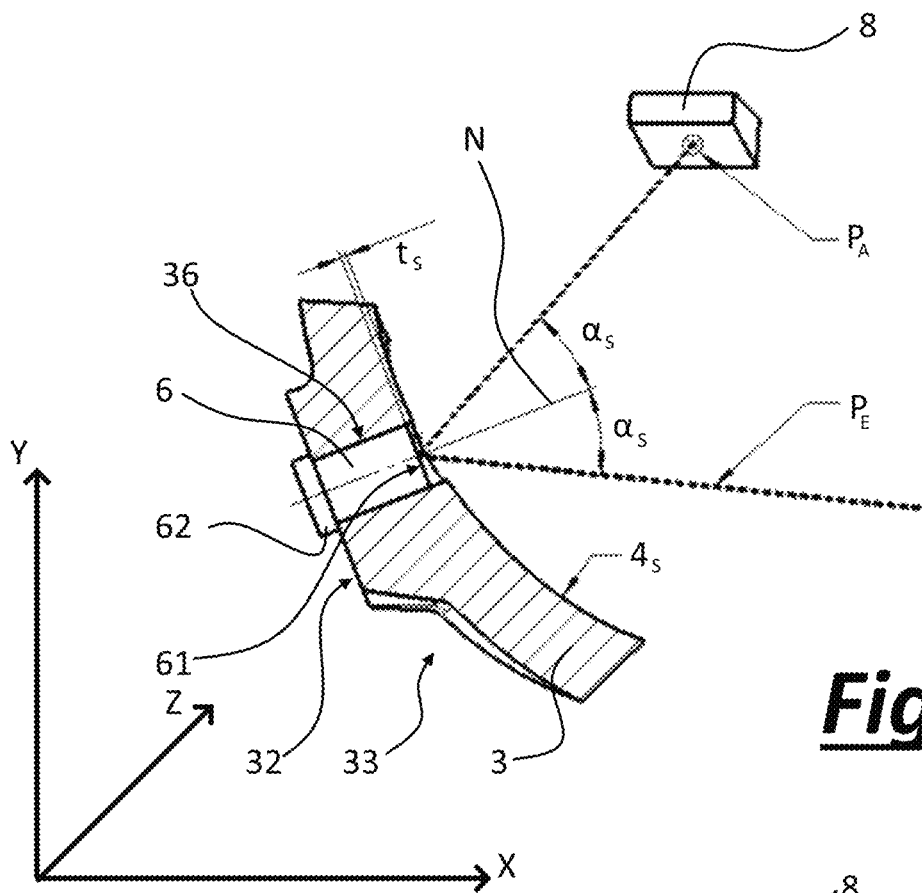
Figure 4A:
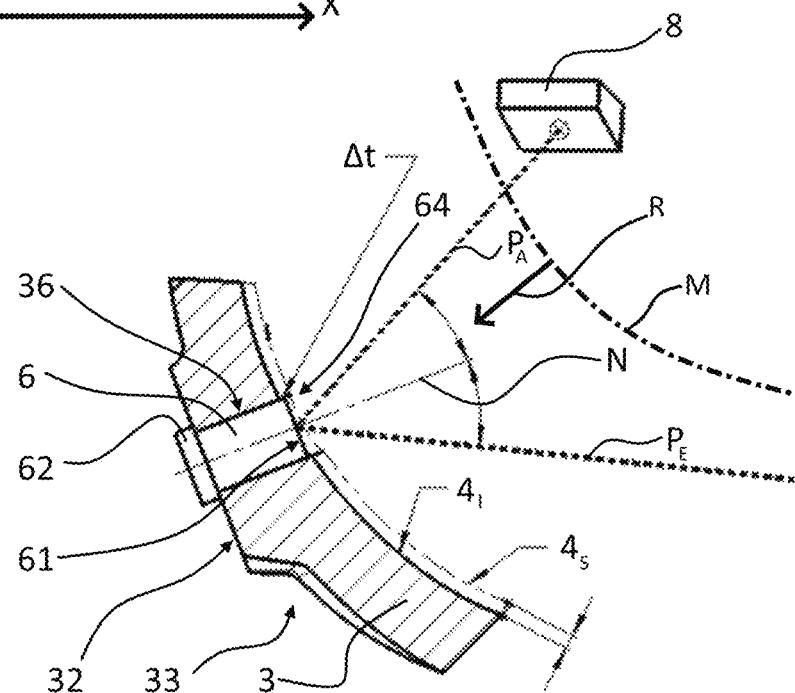
Figure 4B:
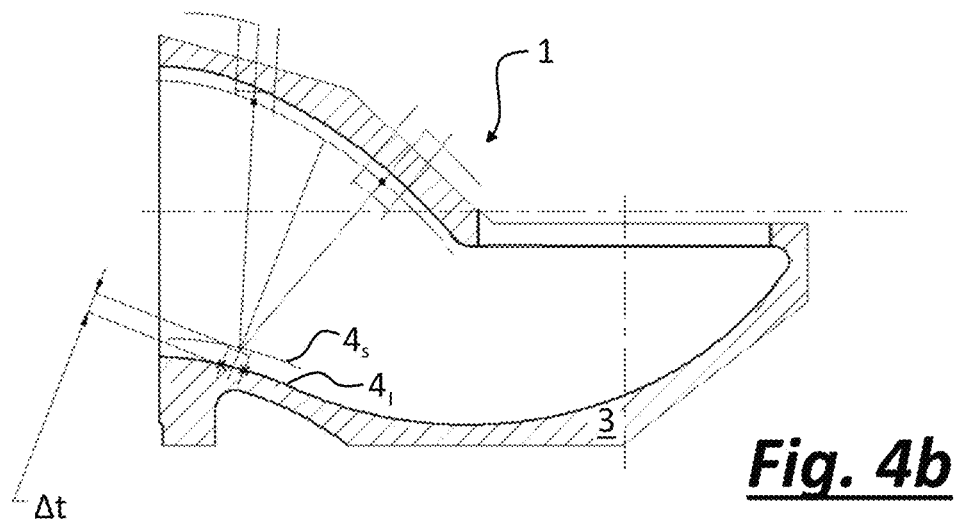
Figure 5A:
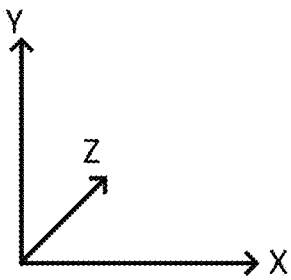
Figure 5A:
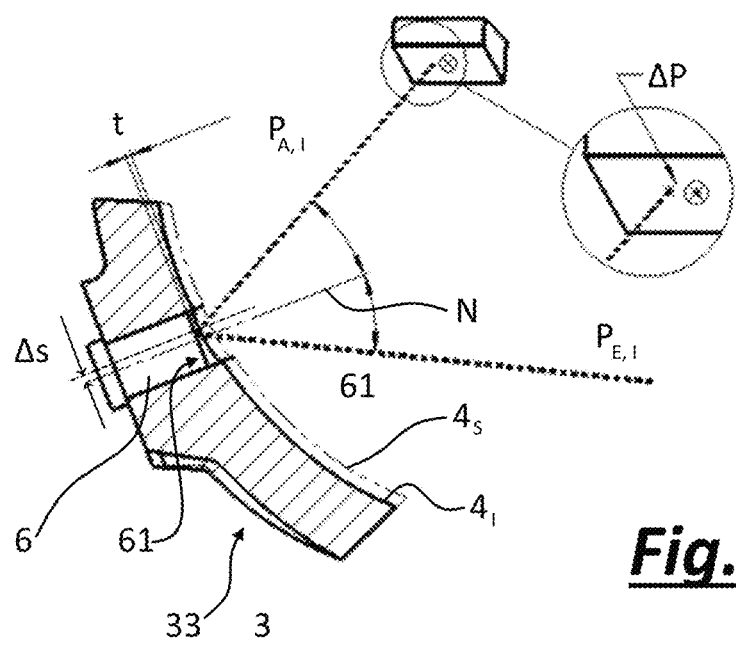
Figure 5B:
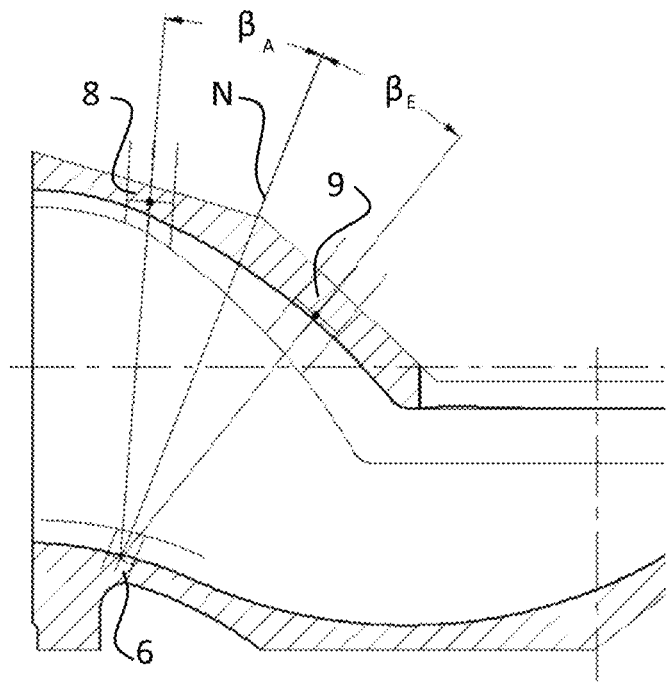
Figure 5C:
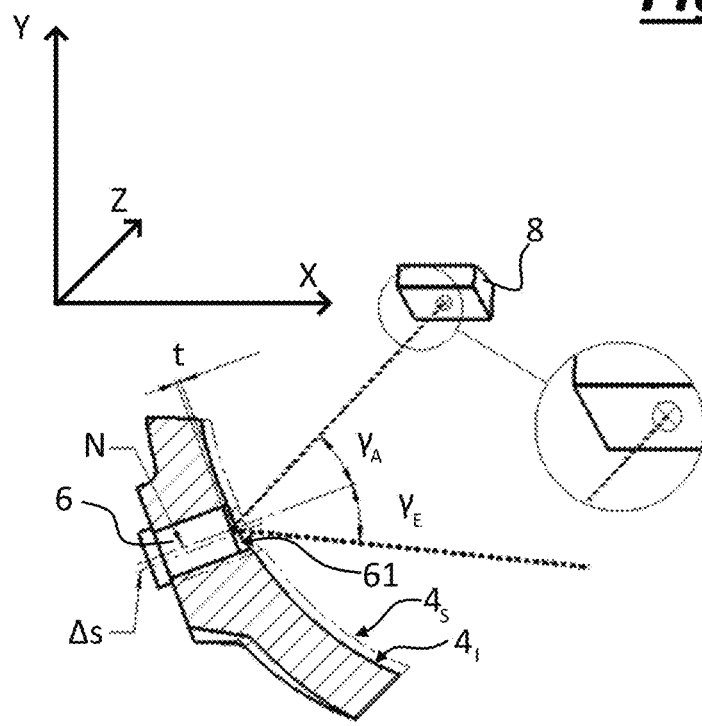

FIG. 1 a desired geometry of the control valve according to an exemplary embodiment of the disclosure with a measuring channel according to the disclosure and a desired arrangement of sensor arrays arranged therein;

FIG. 2 a schematic illustration of the desired array of the first and second sensor array according to an exemplary embodiment;

FIG. 3 the desired arrangement of the passive sensor component in relation to a desired geometry of the measuring channel according to an exemplary embodiment;

FIG. 4a a desired geometry of the sensor component according to FIG. 3 in relation to an actual geometry of the measuring channel;

FIG. 4b a redefined desired arrangement of the passive sensor component according to FIG. 3 in relation to the actual geometry of the measuring channel;

FIG. 5a the desired geometry of the sensor component according to FIG. 3 in accordance with the rearrangement according to FIG. 4b in relation to the actual channel geometry under consideration of an arrangement criterion;

FIGS. 5b and 5c a further rearrangement of the sensor component according to FIG. 3 and the further sensor component;

FIG. 6 a redefinition of the arrangement of one or more further sensor components after the redefinition of the arrangement of the sensor component;

FIG. 7a a sensor component according to an exemplary embodiment whose desired arrangement in relation to the actual geometry of the measuring channel lies within an admissible value range; and FIGS. 7b and 7c a sensor component lying outside of an admissible value range in relation to the actual geometry of the measuring channel according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

The disclosure is directed to a process for spatially arranging at least one sensor component in a measuring channel, as well as a corresponding measuring channel. The disclosure also is related to a process for spatially arranging at least one sensor array comprising at least two sensor components in a measuring channel. The disclosure is furthermore related to a measuring channel for a processing fluid of the processing plant, such as a power plant, a petrochemical plant, a foodstuff processing plant or the like, having a cylinder sleeve-shaped channel wall. Furthermore, the disclosure relates to a control valve housing for a control valve of a processing plant. The disclosure can also relate to a control valve for setting the processing fluid flow of the processing plant.

It is an object of the disclosure to overcome the disadvantages of the prior art, in particular to provide a measuring channel and/or a control valve and a manufacturing process for a corresponding device which, in particular for complex channel geometries, allows for highly precise measurements of processing fluid parameters at relatively little expenditure.

Accordingly, a process for spatially arranging at least one sensor component in a measuring channel is provided, comprising the following steps a) to e):

a) Providing a predetermined desired geometry of the measuring channel. A desired geometry of the measuring channel can for example be provided as geometrical measurements of the reference-measuring channel.

A desired geometry of the measuring channel may be provided as a three-dimensional technical drawing. For example, the desired geometry of the measuring channel may be provided as a vector display and/or as a CAD—(computer aided design) representation, for example in a conventional file format such as DWG or STP. The provision may include reading data from a transient or non-transient storage medium, for example from a CD-ROM, a DVD, a Blu-ray disc, a hard drive or the like. The provision may include transferring data via a network, such as a Bus-network, a wireless-network, the Internet, a local network or the like. Generally, the desired geometry of the measuring signal shall be provided as a theoretical model. The desired geometry of the measuring channel may include data related to the shape and/or the course of the inner surface of the measuring channel or of the channel wall. The desired geometry of the measuring channel or of the channel wall may comprise data regarding a desired extension and/or a desired shape of the body of the measuring channel or of the channel wall, for example related to the channel-outside and/or to the strength of the wall forming the inner channel surface.

b) Providing a desired-sensor-component-arrangement, wherein the desired-sensor-component-arrangement comprises spatially defined positioning parameters and orienting parameters.

The provision of the desired geometry and/or of the desired-sensor-component-arrangement may include the transfer of data. The desired-sensor-component-arrangement may be provided as a three-dimensional technical drawing. For example, a desired-sensor-component-arrangement may be provided as a vector display and/or CAD—(computer aided design) representation, for example in a conventional file format such as DWG or STP. The provision may include reading the data from a transient or non-transient storage medium, for example a CD-ROM, a DVD, a Blu-ray disc, a hard drive or the like. The provision can include the transfer of data via a network, such as a bus-network, a wireless network, the Internet, a local network or the like. Generally, the desired sensor-component-arrangement shall be provided as a theoretical model. A positioning parameter may be a parameter defining a place in a two-dimensional or three-dimensional coordinate system, for example the Cartesian coordinate system, which is associated with the position in a space. An orienting parameter may comprise an angle of rotation in relation to a reference point or an axis of rotation in particular in relation to a two-dimensional or three-dimensional preferably spatial coordinate system. And orienting parameter defines a spatial orientation in a space. A desired arrangement comprising spatially defined positioning parameters and comprising spatially defined orienting parameters may define both a predetermined place in space at which a sensor component shall be arranged, as well as a predetermined orientation of said sensor component in space. Positioning parameters and/or orienting parameters associated with the desired geometry of the measuring channel define a position or orientation in relation to the desired geometry of the measuring channel. A defined desired-sensor-component-arrangement associated with the desired geometry of the measuring channel thus defines the spatial position and the spatial orientation of a sensor component in relation to the desired geometry of the measuring channel.

c) At least sectionally capturing an actual geometry of the measuring channel.

The actual geometry of the measuring channel may be captured in places at a point of the measuring channel. The actual geometry of the measuring channel may be captured in places at several points of the measuring channel. The actual geometry of the measuring channel may be captured sectionally in an area, for example a circular area or a cylinder shell surface area of the inner channel surface of the measuring channel. A sectional capturing of the actual geometry of the measuring channel may be performed by capturing several places of the measuring channel with a small distance, especially of view micrometers or few millimeters, relative to one another, and a sectional actual geometry of the measuring channel can be determined on the basis of the several captures in places. A sectional capturing of the actual geometry of the measuring signal may be performed on the basis of an areal scan. Capturing the actual geometry of the measuring channel can for example be performed by means of tactile measuring probes, which is through mechanical scanning elements. Capturing the actual geometry of the measuring channel can for example be performed optically through an optical scan-sensor. Capturing the actual geometry of the measuring channel can for example be performed through acoustical, preferably through an ultrasonic, measurement of the measuring channel.

d) Determination if at least one positioning parameter or orienting parameter of the desired-sensor-component-arrangement with respect to the actual geometry lies outside of an admissible value range, wherein, in case on the basis of the determination at least one positioning parameter or orienting parameter of the desired-arrangement does lie outside of the admissible value range in relation to the actual geometry, this positioning parameter or orienting parameter of the desired-sensor-component-arrangement is redefined in compliance with the admissible value range, and thereafter step d) is repeated.

An admissible value range may for example be an admissible position-value-range which may in particular be defined as an admissible maximal distance in relation to a reference position. An admissible value range may for example be an admissible orienting-value-range, which may in particular be defined as an admissible maximal angular offset in relation to a reference vector. An admissible value range may be predetermined. An admissible value range may be defined in relation to the actual geometry of the measuring channel. It shall be clear, that the actual geometry of the measuring channel may oftentimes deviate from the desired geometry of the measuring channel at least in places or sections. For example, the measuring channel may be made as a cast part, wherein the actual geometry of the measuring channel deviates from the desired geometry of the measuring channel due to manufacturing. The actual geometry of the measuring channel may deviate from the desired geometry of the measuring channel for example in size-shaped and/or surface quality. For example, the actual geometry of the measuring channel may have a smaller channel cross-section, a sectionally different channel shape, a sectionally different channel curvature and/or a sectionally different cross-sectional channel shape in comparison to the predetermined, ideal desired geometry of the measuring channel. The desired-sensor-component-arrangement may be associated with the actual geometry through a particularly predetermined correlation of the actual geometry with regard to the desired geometry. Such correlations are generally known to the person skilled in the art. An exemplary correlation is for example described in US 2008/0188986 A1. A redefinition of at least one positioning parameter and/or orienting parameter of the desired arrangement within the admissible value range may be performed by determining a difference between a positioning parameter of the desired arrangement and the admissible value range with regard to the actual geometry. In case of a difference, for example a path-difference and/or an angular difference, the positioning parameter deviating from the admissible value range will be modified by the determined path-difference and/or the orienting parameter deviating from the admissible value range will be modified by the determined angular difference. Step d) can be repeated several times in case several positioning parameters and/or orienting parameters lie outside of the admissible value range with respect to the actual geometry.

e) Arranging the sensor component in the measuring channel according to the most current desired-sensor-component-arrangement.

It shall be clear that step e) is performed after step d). The most current desired-sensor-component-arrangement corresponds to a desired-sensor-component-arrangement lying within the admissible value range with respect to the actual geometry. The process particularly dispenses with the provision, particular the manufacturing, fastening and/or arranging, of any reference points to the measuring channel, in particular the cast body. According to one embodiment, it may be provided that a reflective surface is provided to the measuring channel, wherein the inner channel surface of the measuring channel with the exception of said reflective surface is provided as an unfinished cast body and/or that the measuring channel is provided free of any reference areas with the exception of one reflective surface.

With the process according to the disclosure it is possible to arrange, that is to spatially arrange and to spatially orient, a sensor component with high precision within a relatively imprecisely manufactured measuring channel, so as to allow for a high measuring precision of processing fluid parameters. For example, the measuring channel may be manufactured with tolerances in the range of millimeters while nonetheless allowing for arrangement-tolerances of the sensor component in the range of micrometers. The arrangement of the sensor components may include creating a sensor-component-reception in the measuring channel on the basis of the actual geometry of the measuring channel and/or of the desired-sensor-component-arrangement. For example, an erosion, boring and/or milling may be used for creating a reception for the sensor components on the basis of the actual geometry and the desired-sensor-component-arrangement which lies within the admissible value range, for mounting the sensor component in accordance with its desired-sensor-component-arrangement in the reception afterwards.

According to an exemplary embodiment of a process according to the disclosure, the measuring channel and/or the control valve housing is manufactured in a casting process.

According to a further aspect of the disclosure, which may realize a further development of the above-mentioned process, a process for spatially arranging at least one sensor array comprising at least two sensor components in a measuring channel is provided. The process particularly omits the provision, in particular making, fastening and/or arranging, of any reference points to the measuring channel, in particular the cast body. A sensor array is a group of several interacting active and/or passive sensor components. An active sensor component may send and/or receive sensor signals for determining a processing fluid parameter. An active sensor component can thus be designated as a sensor-emitter-component or as a sensor-receiver-component. An active sensor component capable of both sending and receiving sensor signals may be called a sensor-transceiver-component. A passive sensor component may divert or deflect, in particular reflect, focus or the like, a sensor signal for capturing a processing fluid parameter. A passive sensor component may for example be a sensor-signal-lens or sensor-signal-reflector. A passive sensor-reflector-component may be realized in form of a wall section of the inner channel surface of the measuring channel (mirror surface or reflection plane). A mirror surface may be milled and/or polished. A sensor array comprising two sensor components, for example an active sensor component and a passive sensor component or two active sensor components may be called a sensor pair. A sensor array may comprise three, four or more sensor components. In an exemplary embodiment, a sensor array consists of three, four or five sensor components, but is not limited thereto. A sensor array comprises at least one active sensor component and at least one further, active or passive sensor component. A sensor array may comprise at least one active sensor component and several passive sensor components. According to an exemplary embodiment, a sensor array comprises two active sensor components and to passive sensor components, wherein one of the passive sensor components is a reflection plane.

The process for spatially arranging at least one sensor array comprises the following steps a) through d).

a) Providing of a predetermined desired-geometry of the measuring channel.

b) Providing a desired-sensor-array-arrangement associated with the desired geometry of the measuring channel, wherein the desired-sensor-array-arrangement comprises spatially defined positioning parameters and orienting parameters regarding the several active and/or passive sensor components.

In an exemplary embodiment, for at least two sensor components of the sensor array, spatially defined positioning parameters and spatially defined orienting parameters associated with the respective first sensor component as well as spatially defined positioning parameters and spatially defined orienting parameters associated with a respective second sensor component may be provided. For a sensor array comprising three or more sensor components, positioning parameters and orienting parameters associated with the three sensor components, respectively, may be provided. For a sensor array comprising two or more sensor components, respective predetermined positioning parameters and orienting parameters may be provided for each respective sensor component of the two or more sensor components.

c) Capturing and actual geometry of the measuring channel at least in places.

The actual geometry of the measuring channel can be captured in several places or in several sections. The actual geometry of the measuring channel can be captured along a section or along several sections. The actual geometry of the measuring channel can be captured along the entire spatial extension of the measuring channel. The actual geometry of the measuring channel can be captured for the entire interior channel surface.

d) Determination if at least one positioning parameter or at least one orienting parameter of the desired-sensor-array-arrangement, i. e. in particular one parameter of the desired-sensor-component-arrangement of one of the sensor components, lies outside of an admissible value range of the measuring channel with respect to the actual geometry, wherein, in case the parameter does lie outside of an admissible value range relative to the actual geometry according to the determination of the at least one positioning parameter or of the at least one orienting parameter of the desired-sensor-array-arrangement, this positioning parameter or orienting parameter of the desired-sensor-array-arrangement is redefined in compliance with the admissible value range; and wherein at least one further positioning parameter and/or orienting parameter of the desired-sensor-array-arrangement is redefined according to at least one predefined arrangement criterion, and subsequently step d) is repeated.

An arrangement criterion may for example be a relative arrangement of at least two or more, for example exactly two, exactly three or exactly four, sensor components in relation to one sensor component or in relation to one another. An arrangement criterion may for example be a calculated sensor-signal-beam-path starting at an active sensor component. For example, a sensor-signal-beam-path or sensor-signal-path can be calculated according to the focus, deflection, diversion, particularly reflection, through a predetermined passive sensor component and to serve as an arrangement criterion such that all sensor components are arranged, that is positioned and oriented, corresponding to a predetermined sensor-signal-path within an admissible value range (i.e.: physically correct). For example, an arrangement criterion may refer to one active and to one passive sensor component and related to a sensor-signal-beam-path starting at the active sensor component and being modified through the passive sensor component. An arrangement criterion may for example be referring to a sensor-signal-beam-path starting from an effective surface of one of the active or passive sensor components strikes into or near, within an admissible tolerance, the center point of the further sensor component. An arrangement criterion may be defined on the basis of the rule of the reflection, for example based thereon that, for a passive reflector-sensor-component, the sensor-signal-path-entry-angle in relation to a normal vector to the effective surface of the passive reflector-sensor-component equals the exit angle in relation to said normal vector to the effective surface. According to one arrangement criterion, exactly two sensor components are provided with flush-aligned normal vectors in relation to their respective surfaces. The determination according to step d) may take one arrangement criterion or several arrangement criteria into consideration. Step d) may be repeated until the positioning parameters and the orienting parameters of at least one, at least two, at least three or more or all of the sensor components lie within the respective admissible value range and correspond to the at least one arrangement criterion or to the several arrangement criteria.

According to one embodiment, the primary arrangement criterion may be defined as a predetermined orientation of an active sensor component, in particular of exactly one active sensor component per sensor pair or sensor array. In particular, the primary arrangement criterion may be defined as a fixed orientation of the active sensor component as a vector in space. In an exemplary embodiment, the secondary arrangement criterion may be defined such that the positioning parameter of the active sensor component is at least partially undefined, for example exclusively in the direction of the predetermined orientation, wherein the primary arrangement criterion may at least sectionally define a sensor-signal-beam-path as mandatory.

Alternatively or additionally, a secondary arrangement criterion may be defined on the basis of the predetermined fixed arrangement parameter, in particular positioning parameter and orienting parameter, a passive sensor component, in particular a reflection surface, wherein the arrangement criterion may be defined as a reference plane in space. The secondary arrangement criterion may serve as a basis for the determination of the beam-path-entry-angle and of the beam-path-exit-angle in relation to the reference plane corresponding to the effective surface and to the normal vectors to the effective surface reference plane, in particular with the aid of the rule of reflection.

It shall be clear that the admissible value range of different sensor components may be defined differently. For example, the first sensor component may be associated with the first admissible value range and the second sensor component may be associated with the second admissible value range, etc. The first admissible value range of the sensor component may be defined as admissible positioning parameters and/or orienting parameters of the respective sensor component in relation to the actual geometry of the measuring channel. An arrangement criterion may relate to at least two sensor components of the sensor array or two more sensor components of the sensor array.

e) Arranging the sensor components of the sensor array in the measuring channel corresponding to the most current desired-sensor-array-arrangement. In an exemplary embodiment, a desired-sensor-array-arrangement is in particular defined through several desired-sensor-component-arrangements, in particular by at least two, three or at least four desired sensor-component-arrangements. In an exemplary embodiment, the sensor-array arrangement is defined through the desired-sensor-component-arrangements of all of the sensor components of the sensor array.

An exemplary embodiment of the process defines a provision of an in particular curved measuring channel and a stationary holding of the measuring channel, wherein in particular the measuring channel at least during step c), d) and/or e), in particular throughout the steps c) through e), is continuously held stationarily. By providing and stationarily holding the measuring channel during step c) (capturing the actual geometry of the measuring channel) and/or during step d) (determination of at least one desired sensor-component-arrangement with respect to the actual geometry and possibly adapting the desired-sensor-component-arrangement(s) regarding the actual geometry on the basis of an admissible value range and/or possibly a predetermined arrangement criterion for obtaining more current desired-sensor-component-arrangement(s)) and/or during step e) (arranging the sensor component(s) according to the most current desired-sensor-component-arrangement), surprisingly, a particularly precise positioning of the sensor component or sensor arrays comprising several sensor components could be achieved almost independent of the manufacturing tolerance of the measuring channel. In particular, the process in its entirety could be accelerated but the necessary expenditure decreasing substantially through precisely holding the measuring channel stationary. When the measuring channel is held stationary in particular continuously, a precise capturing of the actual geometry of the measuring channel may be rendered increasingly precise on the basis of several capturing steps which are performed separate from another in time, without having to redundantly capture measurement points for the temporarily separated capturing steps. For example, the measuring channel can be particularly continuously stationarily held in a measuring-and-manufacturing-tool which is provided with both measuring tools for capturing the actual geometry of the measuring channel according to step c) as well as with arrangement-tools for arranging the sensor component (s) in the measuring channel, as well as possibly boring- and milling-tools for creating receptions for the sensor component(s) in the same tool.

According to one embodiment of the process, step c) may comprise that the actual geometry of the measuring channel is scanned optically and/or mechanically. For example, step c) may comprise scanning the actual geometry of the measuring channel with one or more mechanical scanning or probing elements.

According to a further development of the process, step c) may comprise that the positioning parameters and/or orienting parameters of the section of the interior channel surface formed as a mirror surface or reflection plane are captured, wherein the reflection plane acts as a passive sensor component. The positioning parameters and/or orienting parameters of the reflection plane may be taken into consideration for the determination of at least one positioning parameter and/or orienting parameter of at least one passive or active sensor component as a secondary arrangement criterion.

According to an embodiment of the process, step e) may comprise that at least one reception for the at least one sensor component or for the several sensor components. In an exemplary embodiment, exactly one reception for exactly one sensor component or a predetermined number of receptions for the same predetermined number of several sensor components, is/are created, in particular through eroding, boring and/or milling, wherein in particular the reception is formed with an axial stop for the at least one sensor component.

According to one embodiment of the process, step d) may comprise that the positioning parameter of the first sensor component is redefined according to a translational shift in the axial direction of the first sensor component, and/or that the orienting parameter of the first sensor component is redefined according to a rotational turn of the first sensor component in relation to the or around the positioning parameter of the sensor component.

According to one embodiment of the process, step d) may comprise that a first positioning parameter of the sensor component is redefined according to a translational shift in the axial direction of the sensor component, in particular in the direction of the normal vector with respect to the effective surface thereof. In particular, a predetermined desired axial distance of the effective surface in relation to an inner channel surface of the measuring channel may be taken into consideration. A predetermined desired axial distance of the effective surface of the valve component relative to the inner channel surface of the measuring channel may be defined as an admissible value range. For example, an admissible value range may have a value-range-width of ±0.4 mm or smaller. For example, an admissible value range may have a width of ±0.2 mm or less. For example, an admissible value range may have a width of ±0.1 mm or ±0.05 mm. An admissible value range may for example be defined as a distance of at least 0.2 mm in relation to the inner channel surface of the measuring channel, of at least 0.1 mm or of at least 0.01 mm. An admissible value range may be defined as a distance of no more than 2 mm, in particular no more than 1 mm, preferably at most 0.5 mm in relation to the inner channel surface of the measuring channel. For example, an admissible value range may be defined as a distance of 0.2 mm to 1 mm in relation to the inner channel surface of the measuring channel. For example, an admissible value range may be defined as a value-range-width smaller than one times, in particular smaller than half of or one quarter of, a casting manufacturing tolerance according to ISO 8062, in particular according to casting tolerance degree CT 8, casting tolerance degree CT 9, casting tolerance degree CT 10, casting tolerance degree CT 11, casting tolerance degree CT 12, or casting tolerance degree CT 13.

According to a further development of the process it may be predetermined that the first sensor component is a passive sensor component. In an exemplary embodiment, the further sensor component may be a reflector, in particular an ultrasonic reflector. According to one embodiment of the process, the redefinition of the first positioning parameter and/or the orienting parameter of the first sensor component may be determined in accordance with a beam-path-arrangement-criterion, in particular according to a beam-path from one center point of an effective surface of the further sensor component to the center point of the first effective surface of the first sensor component and/or in accordance with a predetermined desired axial distance of one of the first effective surface of the first sensor component in relation to an inner channel surface of the measuring channel.

According to one embodiment of a process, step d) may comprise that the further positioning parameter of the further sensor component is redefined in accordance with a translational shift in the axial direction of the first sensor component, and/or that the further orienting parameter is redefined in accordance with a rotary turn of the further sensor component in relation to the or around the positioning parameter of the further sensor component. In an exemplary embodiment, an emitter and/or a receiver, in particular an ultrasonic emitter, ultrasonic receiver or ultrasonic transducer, may realize the second sensor component.

The redefinition of the further positioning parameter and/or orienting parameter of the further sensor component of the basis of the predetermined desired axial distance of the (further) effective surface of the further sensor component in relation to a (further) inner channel surface of the measuring channel may be determined such as the above-mentioned redefinition of the first positioning parameter of the first sensor component with regard to the inner channel surface.

The redefinition of the further positioning parameter and/or orienting parameter of the further sensor component may be determined such that through a translational shift of the further particularly passive sensor component crosswise with regard to a normal vector of the effective surface of the further sensor component, the beam path is redirected from the active sensor component to the second, passive sensor component and on to the center point of the effective surface of the second component. The redefinition of the positioning parameter and/or of the orienting parameter of the further sensor component on the basis of the beam path may be performed such that the orienting parameter is redefined such that a beam-path-entry-angle from the first sensor component in relation to a normal vector with regard to the effective surface corresponds identically to a beam-path-exit-angle relative to the normal vector of the effective surface and lying in the same beam-path-plane, such that the sensor signal-path, after deflection by the second sensor component hits a third sensor component, particularly in the middle. The redefinition of the further sensor parameter and/or orienting parameter of the further sensor component may comprise one or more of the redefinition-methods described herein. In case the redefinition of the further positioning parameter and/or orienting parameter according to a predetermined admissible value range and/or according to one or more arrangement criteria comprises multiple methods. In an exemplary embodiment, these methods are performed subsequently, during multiple runs of process step d).

According to a further development of the process, a further sensor component may be an active sensor component.

According to one embodiment of the process it is provided that no sensor component, particularly none of the several sensor components, pierces the inner channel surface of the measuring channel. According to an exemplary embodiment of a process according to the disclosure, the at least one sensor component or the several sensor components are arranged within a channel wall of the measuring channel. An arrangement of the sensor component inside of a channel wall means that the entire sensor component or at least the effective surface of the sensor component is completely positioned within a space-section limited by the body or by the radial thickness of the channel wall of the measuring channel. By arranging the sensor component, in particular the effective surface thereof, completely outside of the processing fluid guiding inner channel surface of the measuring channel, it is ascertained that the sensor component does not have a disturbing influence onto the processing fluid and does not impair the measuring precision through any disturbance Alternatively or additionally, a passive sensor component may be formed as a section of the inner channel surface of the measuring channel, in particular as a reflection plane.

According to one embodiment of the process it may be provided that the determination according to step d) is performed in relation to at least one passive sensor component in a first determination. And subsequently, in a second determination period, the determination according to step d) is performed regarding at least one active sensor component, wherein in the second determination period, the determination according to step d) is at first performed in relation to one first of at least two active sensor components and thereafter in regard to a second of at least two sensor components.

The disclosure also relates to a measuring channel for a processing fluid of the processing plant, such as a power plant, a petrochemical plant, a foodstuff processing plant or the like, having a cylinder-sleeve-shaped channel wall, wherein the measuring channel comprises at least one active sensor component for determining a measurement of the processing fluid, such as flow velocity, density, mass flow, or the like, mounted in the channel wall. A measurement of the processing fluid in the sense of this application may also be called processing fluid parameter. According to the disclosure, the channel wall is formed as a cast body and/or has a manufacturing tolerance of ±1 mm or more, in particular of ±2 mm or more. In one embodiment, the channel wall may be manufactured as a cast body and has a surface quality RZ 63-250. The channel wall may be formed as a cast body and have casting manufacturing tolerances in accordance with ISO 8062, in particular casting tolerance degree CT 8, casting tolerance degree CT 9, casting tolerance degree CT 10, casting tolerance degree CT 11, casting tolerance degree CT 12, or casting tolerance degree CT 13. The making of the control valve housing and/or of measuring channel as a cast body is particularly economical. The at least one active sensor component is arranged on the channel wall with a positioning tolerance of ±0.5 mm, in particular ±0.2 mm, or less. Alternatively, the at least one active sensor component is attached to the channel wall with a positioning tolerance of less than the casting manufacturing tolerance of the measuring channel, in particular less than half or less than one quarter thereof. "Less than" is to be understood in the sense of a narrower or smaller, i.e. more precise, tolerance. For example, the lengthwise measurement of the casting manufacturing tolerance for a measuring channel of the nominal width of 50 mm having a casting tolerance degree CT 9 may be 2 mm so that consequently the sensor components is to be arranged with a more precise tolerance <2 mm, in particular <1 mm (i.e. <±0.5 mm), preferably <0.5 mm (i.e. <±0.25 mm).

The nominal width inner diameter of the measuring channel may be at least 5 cm, at least 10 cm, at least 30 cm or more. The casting manufacturing tolerance may be selected dependent on the nominal width interior diameter of the measuring channel as well as in particular on the basis of a casting tolerance degree, preferably according to casting tolerance degree CT 9.

In particular, the active sensor component is arranged in the channel wall of the measuring channel such that the face side, in particular the effective surface, of the active sensor component is arranged in a predetermined distance of 0.0 mm to 2.0 mm, in particular 0.2 mm to 1.0 mm, relative to the inner side of the measuring channel, wherein the face side, in particular the effective surface, of the active sensor component does not project into the inner space of the processing fluid channel.

According to one embodiment of the measuring channel according to the disclosure, the measuring channel comprises at least one sensor array of interacting sensor components, wherein the sensor array comprises the at least one active sensor component and at least one further, active or passive sensor component. The active sensor component comprises an active effective surface. The further sensor component comprises a further, active or passive effective surface. The further effective surface and the active effective surface are arranged with an angular tolerance of ±1% or less relative to one another. In particular, the at least one sensor array comprises one further active sensor component and at least one further passive sensor component, wherein all further effective surfaces, the active effective surface of the further active sensor component and the passive effective surface of the further passive sensor component are arranged with an angular tolerance of ±2° or less, in particular ±1° or less, relative to the active effective surface. Alternatively, all of the sensor components of the sensor array are arranged on the channel wall with the positioning tolerance of less than the cast manufacturing tolerance of the measuring channel, in particular less than half or less than one quarter thereof. "Less than" is to be understood in the sense of a smaller or more narrow, i.e. more precise tolerance. This information may in particular relate to the longitudinal measurement of the cast manufacturing tolerance.

In particular, the passive sensor component is arranged in the channel wall of the measuring channel such that a face side, preferably an effective surface, such as a reflector surface, of the passive sensor component is arranged in a predetermined distance of 0.0 mm to 2.0 mm, in particular 0.1 mm to 1.5 mm, preferably 0.2 mm to 1.0 mm, in relation to the inner side of the measuring channel, wherein the face side, in particular the effective surface, of the passive sensor component does not project into the inner space of the processing fluid channel.

According to one embodiment, the measuring channel comprises at least a second sensor array of interacting sensor components, wherein the second sensor array comprises at least a second active sensor component and at least a second further active or passive sensor component. The first sensor array is arranged in relation to the second sensor array with the positioning tolerance of ±0.5 mm or less, in particular of ±0.2 mm or less. Alternatively, the first sensor array is arranged in relation to the second sensor array with a positioning tolerance of less than the cast manufacturing tolerance, in particular less than half or less than one quarter thereof. In particular, the passive sensor component of the first sensor array is identical with a passive sensor component of the second sensor array. In an exemplary embodiment, the first sensor array and the second sensor array comprise at least one common passive sensor component. In case the sensor component of the first sensor array and of the second sensor array are arranged in the measuring channel according to the process according to the disclosure, the arrangement may be designed such that the arrangement of the commonly used passive sensor component is fixed in a predetermined manner, and in particular during a later or subsequent performance of step d), excluded from any redefinition after having found out that the desired-sensor-component-arrangement of the common sensor component lies within an admissible value range with respect to the measuring channel. Sensor arrays having a common passive sensor component may be called overlapping sensor arrays. By using overlapping sensor arrays it can be achieved in a particularly effective manner that particularly precise measurement results of the processing fluid parameters may be reached, in particular for measurements of the first sensor array in the flow direction of the processing fluid and a measurement of the second sensor array against the flow direction of the processing fluid.

The information regarding the processing tolerance may particularly refer to the longitudinal measurement of the casting manufacturing tolerance. For example, the longitudinal measurement of the casting manufacturing tolerance for a measuring channel having a nominal width of 200 mm at a casting tolerance degree CT 10 may be four millimeters so that consequently the sensor arrays relative to one another are to be arranged with a more precise tolerance of <4 mm, in particular <2 m/i.e. ±1 mm), preferably <1 mm (i.e. <±0.5 mm).

According to an exemplary embodiment of the measuring channel, the active sensor component is a sender (or emitter) and/or a receiver, in particular an ultrasonic emitter, ultrasonic receiver or ultrasonic transducer.

According to an exemplary embodiment, the passive sensor component is a reflector, in particular an ultrasonic reflector.

According to an exemplary embodiment, the sensor component is an ultrasonic sensor component.

According to an exemplary embodiment, the channel wall of the measuring channel defines an interior channel surface facing processing fluid and comprises a sensor reception (e.g. cylindrical sensor reception) which in particular runs through the channel wall in particular radially, wherein the sensor component is arranged within the sensor reception. The sensor component may comprise an active or passive effective surface. In an exemplary embodiment, the effective surface is arranged completely outside of the interior channel surface. In particular, the effective surface is arranged completely radially outside of the interior channel surface in the radial direction. In other words, the effective surfaces completely arranged within the solid material of the channel wall in the area perforated by the sensor reception. According to an exemplary embodiment, the channel wall of the measuring channel defines an interior channel surface facing the processing fluid and comprises a passive sensor component with passive effective area formed as part of the inner channel surface, in particular as a reflection plane.

According to an exemplary embodiment, a measuring channel according to the disclosure is made in the process according to the disclosure. In particular, the process according to the disclosure may be performed for making a measuring channel according to the disclosure. In exemplary aspects, the process according to the disclosure may be performed to create a measuring channel according to the disclosure.

The disclosure also relates to a control valve housing for a control valve of the processing plant, such as a power plant, a petrochemical plant, a foodstuff processing plant or the like, which comprises a processing fluid entry, a processing fluid exit and a closable valve seat arranged between the processing fluid entry and the processing fluid exit, wherein the control valve housing is at least sectionally formed as a measuring channel.

According to an exemplary embodiment of the control valve housing, the measuring channel is arranged at the processing fluid entry and/or at the processing fluid exit.

The disclosure also relates to a control valve for setting processing fluid flow of a processing plant, such as a power plant, a petrochemical plant, a foodstuff processing plant or the like, comprising a control valve housing at least sectionally formed as a measuring channel, and a movable valve member for closing the valve seat.

According to one embodiment, the control valve comprises a pneumatic, hydraulic or electric actuator for operating the valve member and/or closed loop and/or open loop control electronics (controller) for controlling the actuator.

In an exemplary embodiment, the open-loop and/or closed-loop control electronics acts on to the actuator on the basis of processing fluid parameters captured with the at least one sensor component and/or the at least one sensor array. In an exemplary embodiment, the open-loop and/or closed-loop control electronics are communicatively connected with the at least one sensor component and/or with the at least one sensor array. In an exemplary embodiment, the closed-loop and/or open-loop control electronics is configured to provide a control signal to the actuator which corresponds to processing fluid parameters having been measured by means of the sensor component and/or the sensor array.

Generally, in a process for arranging the sensor component or a sensor array on the basis of a theoretical model (desired measuring channel geometry and desired sensor-component- or desired-sensor-array-arrangement), prominent points in the particularly curved measuring channel are measured (actual measuring channel geometry). On the basis of the actual measuring channel geometry, the desired-sensor-array-arrangement is recalculated and determined with regard to the actual measuring channel geometry. The new orientation and positioning of the arrangement of the sensor components or of the sensor array influence each other reciprocally. This procedure is repeated until the orientation of the position of the sensor component arrangement or sensor array arrangement lies within a predetermined tolerance with respect to the actual measuring channel geometry. The process particularly dispenses with the attachment, in particular the manufacturing, fixing and/or arrangement, of reference points on the measuring channel, in particular the cast body.

A measuring channel according to the disclosure is generally designated with reference numeral A control valve housing is generally designated with reference numeral 100. The index "I" is generally used for an actual geometry whereas the index "S" generally designates a desired geometry.

FIG. 1 shows a valve housing 100 according to an exemplary embodiment. The valve housing has a flow direction indicated with an arrow, wherein following one another in the flow direction at first a processing fluid entry 103, and subsequently a closable valve seat 107 and thereafter a processing fluid exit 105 are formed in the control valve housing 100. In the embodiment shown in FIG. 1, the measuring channel 1 is arranged at the processing fluid entry 103 of the control valve housing 100. A movable valve member 109 for closing the valve seat 107 and actuator 111 for operating the valve member 109 are indicated in dashed lines. Open loop and/or closed-loop control electronics are not shown in detail. In an exemplary embodiment, the closed-loop control electronics includes processor circuitry that is configured to perform one or more functions and/or operations of the closed-loop control electronics.

The valve housing 100 provides channel cross-section that can be passed through by the processing fluid. As indicated schematically in FIG. 1, the channel cross-section may change its shape, cross-sectional size, cross-sectional shape, and orientation from the processing fluid entry 103 to the valve seat 107. A channel cross-section changing in multiple ways from the processing fluid entry 103 and exit 105 or closable effective surface 107 may be described as a channel cross-section of complex geometry.

The valve housing 100 and the measuring channel 1 formed integrally with it comprises a channel wall 3. The thickness of the channel wall 3 may vary locally, that is, be differently strong at different places in the flow direction and/or in the circumferential direction along the course of the channel. The course of the channel may be defined in relation to a centerpoint line M. The thickness of the channel wall may be defined in a radial direction R relative to the centerpoint line M. The inner channel surface 4 or contour of the measuring channel's area through which processing fluid passes may preferably have a continuously rounded appearance, wherein the curvature of the rounding may differ locally or, in other words, have location-dependent different radii of curvature.

In FIG. 1, the interior contour 4 of the channel 1 is shown in accordance with an ideal desired geometry. In accordance with, for example, casting tolerances, the actual geometry of the interior contour 4 of the measuring channel 1 may significantly deviate from the desired geometry. This will be detailed more below. The channel wall may be formed as a cast body and have casting manufacturing tolerances in accordance with ISO 8062 (preferably ISO 8062-3:2008-09), in particular casting tolerance degree CT 9, casting tolerance degree CT 10, casting tolerance degree CT 11, casting tolerance degree CT 12 or casting tolerance degree CT 13.

| measuring channel-nominal width [mm] | longitudinal dimension [mm] casting tolerance according to EN ISO 8062-3 (2008-09) degree of casting tolerance CT | | | | | |
|---|---|---|---|---|---|---|
| | 8 | 9 | 10 | 11 | 12 | 13 |
| 0-10 | 1 | 1.5 | 2 | 2.8 | 4.2 | — |
| >10-16 | 1.1 | 1.6 | 2.2 | 3 | 4.4 | — |
| >16-25 | 1.2 | 1.7 | 2.4 | 3.2 | 4.6 | 6 |
| >25-40 | 1.3 | 1.8 | 2.6 | 3.6 | 5 | 7 |
| >40-63 | 1.4 | 2 | 2.8 | 4 | 5.6 | 8 |
| >63-100 | 1.6 | 2.2 | 3.2 | 4.4 | 6 | 9 |
| >100-160 | 1.8 | 2.5 | 3.6 | 5 | 7 | 10 |
| >160-250 | 2 | 2.8 | 4 | 5.6 | 8 | 11 |
| >250-400 | 2.2 | 3.2 | 4.4 | 6.2 | 9 | 12 |
| >400-630 | 2.6 | 3.6 | 5 | 7 | 10 | 14 |
| >630-1000 | 2.8 | 4 | 6 | 8 | 11 | 16 |
| >1000-1600 | 3.2 | 4.6 | 7 | 9 | 13 | 18 |

FIG. 1 also shows a sensor array 50 having four sensor components 51, 53, 57, and 59. In an exemplary embodiment, the sensor array 50 comprises a first active sensor component 51, which may be realized as an ultrasonic sensor, and a further first active sensor component 59, which may be a realized as an ultrasonic receiver. The first sensor array 50 comprises two passive sensor components 53 and 57 which may for example be realized as ultrasonic reflectors.

In FIG. 1, a sensor signal path P50 of the first sensor array is indicated with a dashed line. The sensor signal path symbolizes the path taken by an ultrasonic sensor measuring signal from the first active component 51 to the further active component 59, wherein the signal path P50 is deflected by the passive sensor components 53 and 57. For example, a sensor signal path P50 may for example run in a clockwise circumferential direction in accordance with the schematic illustration in FIG. 1. The sensor signal path P50 may run from the first sensor component 51 to the further active sensor component 59 additionally or alternatively in the direction of the flow direction of the processing fluid.

FIG. 2 shows a schematic illustration of two sensor arrays 50, 70, arranged within a measuring channel which is not shown in further detail, according to an exemplary embodiment. The sensor signal P50 of the first sensor array runs as described above.

The sensor signal path P70 of the second sensor array 70 may run in the opposite direction in relation to the signal path P50 of the first sensor array 50. For example, the sensor signal path P70 of the second sensor array 70 may run counterclockwise in the circumferential direction of the channel and from the active sensor element 71 towards the further active sensor element 79 of the second sensor array 70. Therein, the sensor signal of the second sensor array 70 may be deflected by two passive sensor components 75, 73. The sensor signal path P70 of the second sensor array 70 may alternatively or additionally run in the opposite direction with regard to the flow direction of the processing fluid within the measuring channel which is not shown in detail, from the second active sensor component 71 to the second further active sensor component 79 of the second sensor array 70.

It shall be clear that the active sensor component 51, 59, 71, 79 of the sensor array may be formed pairwise as a sender (emitter) and a receiver, or as transceivers. As indicated in FIG. 2, both of the sensor arrays 50, and 70, may comprise a common passive sensor component, which herein has the reference numerals 57 and 75. The first sensor array 50 and the second sensor array 70 use a sensor signal reflector 57/75 together so that the measuring results of the two sensor arrays can be better correlated and/or compared to one another. In particular, the common sensor signal reflector may be realized as a reflection plane realized as a part of the inner channel surface 4 of the measuring channel 3.

FIG. 3 shows an ideal desired measuring channel geometry with a sensor component provided thereto corresponding to a desired arrangement, for which subsequently reference numeral 6 shall be used for ease of reference, according to an exemplary embodiment. It shall be clear that the sensor component 6 stands for any arbitrary passive sensor component 53, 57, 73, or 75, wherein any of the subsequently described adaptation steps may equally find application in order to define a desired geometry of an active sensor component 51, 59, 71 or 79.

FIG. 3 shows the ideal desired state in which the arrangement of the sensor component 6 with regard to the desired channel geometry as well as with regard to the arrangement of the remaining sensor components (schematically shown with reference numerals 8 and 9).

The desired arrangement of the sensor component 6 is defined by the position of the sensor component in space. The position of the sensor component 6 in space can for example be determined according to a current hazy and X/Y/Z-coordinate system. The orientation of the sensor component 6 in space may be defined through the orientation of the effective area normal vector and in relation to the coordinate vectors X, Y and/or Z. The desired arrangement of the sensor component 6 may ideally lie in the middle of an admissible value range and be ideally arranged with regard to one or multiple arrangement criteria. It shall be clear that also other mathematical models for determining the arrangement, that is the position and the orientation, may use for example a cylinder coordinate system, a sphere coordinate system, or the like.

For example, the sensor component 6 is arranged according to desired sensor component arrangement with regard to an admissible value range such that the plane effective surface 61 which is built on the face side of the cylindrical sensor component 6, is arranged within the channel wall 3 with an axial distance ts towards the interior contour 4 of the measuring channel 1. The entering sensor signal path PE it's the concentric or center point of the effective surface 61 through which also the normal vector N runs. The entry angle α is equal to the exit angle α in relation to the normal vector N of the effective surface. The exiting signal path PA strikes the mid-point of the further sensor component 8.

A sensor component 6 may generally be formed as a rotationally symmetrical cylindrical body having a flat effective sensor surface or front face 61. The concentric: center point of the effective sensor surface is crossed in space perpendicularly with respect to the effective surface 61 by the normal vector N of the effective surface. The cylindrical body of the sensor component 6 may be rotationally symmetrical relative to the normal vector N of the effective surface. For precisely positioning the sensor component in the axial direction of its effective-surface-normal vector N, and projecting extending radially with regard to the effective-surface-normal vector N, such as a nose or shoulder 62, may be provided. In an exemplary embodiment, the projection is attached to the end of the sensor component opposite to the effective surface 61. The shoulder 62 of the sensor component 6 may be designed to engage an opposite stop surface 32 of the channel wall 3 on the outside 33 of the channel wall opposite to the interior contour 4. In the channel wall 3, a reception 36 may be provided formed complementarily to the cylindrical shape of the sensor component 6, which reception may for example be bored or milled. Other shapes of the sensor component and of the reception are conceivable.

When the arrangement of the sensor component 6 in relation to the actual geometry lies outside of an admissible value range and/or does not meet one or several arrangement criteria, a redefinition of the arrangement of the sensor component 6 may be performed. For example, the redefinition of the arrangement of the sensor component may be performed under consideration of an admissible value range. If, for example, a positioning parameter of the sensor component 6 does not correspond to an admissible value range, the difference between the positioning parameter and the admissible value range or an optimal value within the admissible value range can be determined, and, on the basis of the difference, a redefinition of the desired positioning parameter of the sensor component 6 may be performed. A redefinition of the desired arrangement of the sensor component on the basis of the positioning parameter may be called a shift of desired positioning value.

When the desired arrangement of the sensor component 6 angularly deviates from an admissible value range, for example in case the normal vector N of the sensor component 6 is tilted, turned and/or skewed in relation to the admissible value range, a redefinition of the orienting parameter of the sensor component 6 may be performed. For redefining the orienting parameter of the sensor component, for example, a difference between the normal vector N perpendicular to the effective surface 61 and an admissible value range may be determined and the normal vector N be recalculated on the basis of the difference.

An admissible value range may be defined through an arrangement criterion or through several arrangement criteria. An arrangement criterion designates a set of desired requirements regarding a desired arrangement of the sensor component in relation to the desired arrangement of at least a further, other sensor component. For example, one configuration criterion may be predetermined, according to which the normal on the effective surface of the sensor component goes through a center point of an effective surface of another sensor component.

As an arrangement criterion particularly regarding the reflective passive sensor component, can be provided that the sensor-beam-path-part is provided from at least one further sensor component 8 to at least one other further sensor component 9, wherein the sensor signal path experiences a reflection on a reflecting sensor-effective surface 61 of the sensor component 6. According to one arrangement criterion, the sensor-signal-part entry angle α or $\beta_E$ of the sensor-signal-entry-part $P_E$ in relation to the effective surface normal vector N equals the exit angle α or $\beta_A$ of the sensor-signal-exit path $P_A$ relative to the sensor surface normal.

FIG. 4 a shows the desired-sensor-component-arrangement of the sensor component 6, according to an exemplary embodiment, defined in relation to the desired geometry of the channel contour $4_S$ in relation to a captured actual geometry of the channel contour $4_I$. In the shown example, the actual contour 4 I deviates from the desired contour $4_S$. The actual contour $4_I$ is outwardly offset in relation to the channel center point M in the radial direction R. This may for example be due to relatively coarse tolerances of the cast manufacturing process of the measurement channel 1.

Due to the deviation of the actual contour $4_1$ from the desired contour $4_S$, the desired arrangement of the sensor components 6 pierces into the channel interior guiding the processing fluid. The front edge 64 of the sensor component 6 forms a projection extending into the channel in relation to the channel contour $4_I$. If processing fluid flows through the channel 1, it is deflected by the projection 64, whereby swirls could be formed, possibly impairing the behavior of the fluid and falsifying the measurements by the sensor components 6.

The capturing of the actual geometry can for example be performed according to the following scheme:

Capturing the actual geometry may be performed locally on or near an expected position based on the desired arrangement of the sensor component 6. For example, the capturing of the actual geometry in places may be performed at the desired position of the reception 36 in the channel wall 3 intended according to the desired arrangement of the sensor component 6. If the reception 36 is provided as a bore or the like, and it can have a cylindrical shape which is formed rotationally symmetrical around the normal vector N. On the basis of the predetermined desired geometry, a penetration curve of the reception 36 can be calculated in relation to the interior contour $4_S$. Along the penetration curve, several places may be captured by a measuring probe. For example, a mechanical measuring probe may scan three points of the actual geometry of the channel wall 3 along the interior contour 4.

The location of the measuring points may be calculated and scanned on the basis of three predetermined points of the desired geometry over an interior contour $4_S$. These three points may for example be offset around the normal vector N by 100 along the penetration curve. It may be determined with regard to an axial direction in relation to the normal vector N, which one of these three captured points is the lowest, that is the furthest outward with regard to the radial direction R. Around this deepest point along the penetration curve (the theoretical circumferential line surrounding the bore) further measurements may be performed exemplarily according to an estimation in relation to the normal at +5° and −5° relative to the lowest point. According to the three measurements offset in pairs by 5° each around the deepest point, subsequently, with increased precision, another lowest point with regard to the normal vector N can be determined. Starting with this, once more, two more points along the penetration curve offset by the once more halved angle (±2.5°) may be captured. This procedure may be repeated several times with iteratively increasing angular position. It shall be clear that for the iterative increase in position other decreases of the angular area than the exemplary halving of the angle described herein may be used. The determination of the lowest point according to three points offset by angles becoming smaller along the penetration curve may be repeated until predetermined tolerance between the lower-most and the second-lowermost point is achieved. According to this deepest point of the interior contour $4_I$ of the actual geometry, the distance (the positioning difference) Δt of the front face 61 of the sensor component 6 relative to the admissible value range is determined. Such a determination and (re)definition of the position may be performed for a passive sensor component or for an active sensor component. A process according to the disclosure may comprise a detection and the (re-)definition of one or more passive sensor components and/or of one or more active sensor components.

FIG. 4b shows a channel 1 in the entry area 103 of the control valve body 100, according to an exemplary embodiment. In the measuring channel 1, the inner contour $4_I$ or $4_S$ according to the measured actual geometry or the predefined desired geometry is shown, as well and the newly defined desired arrangement of the sensor component 6 shifted by the positioning correction Δt in the axial direction of the normal vector N.

FIG. 5a shows a section of the measuring channel 11 with a sensor component 6, according to an exemplary embodiment, the desired arrangement of which has experienced a redefinition, as described with regard to FIG. 4B. Due to the parallel shift in the axial direction of the normal vector N, the incoming signal path $P_E$ does not meet the centerpoint pierced by the normal vector N, in particular the circle middle point, of the sensor component 6. The signal path reflected by the sensor component 6 on the effective surface 61 thus runs parallel and offset in comparison to the desired signal path (cf. FIG. 3) and does not meet but rather miss the further sensor component 8. The actual meeting point of the signal path $P_E$, $P_A$ is offset from the sensor normal vector N in the crosswise direction by a translational distance Δs.

FIG. 5b shows a redefined position of the sensor component 6, according to an exemplary embodiment, in relation to the actual geometry of the measuring channel 11 as described in FIGS. 4a and 4b, as well as with regard to the arrangement criterion, according to which the signal path $P_A$, $P_E$ shall centrally meet corresponding to the penetration line of the normal vector N onto the effective surface 61 of the sensor component. Therefore, the position of the sensor component is redefined in that a translational shift of the sensor component 6 is given according to the translational difference Δs. Theoretical entry angle $β_E$ and exit angle $α_E$ are determined, which are related to the respective center point of the other sensor components 8 and 9. Due to the offset by Δs, the theoretical entry angle $β_E$ is larger than the theoretical exit angle $β_A$. Subsequently, based on the configuration criterion according to which entry angle and exit angle shall be equally large, the orientation of the sensor component 6 is a redefined such that the normal forms an angle bisector regarding the redefined entry- and exit-angle c. This redefined arrangement of the sensor component 6 is shown in FIG. 5c.

FIG. 5c shows the result of the multifold redefinition of the arrangement, according to an exemplary embodiment, i.e. of the positioning and orientation of the sensor component 6 with regard to the actual geometry of the measuring channel 11 and with regard to the arrangement criteria. Based on the arrangement of the rearrangement of the sensor component 6, the determination may be performed, if the sensor component 6 is rearranged according to the arrangement criteria lies within the pre-defined admissible value range. According to the admissible value range, the effective surface 61 of the sensor component 6 shall be sufficiently far from the interior contour $4_I$ according to the actual geometry. Insofar as necessary, a further redefinition of the position of the sensor component 6 with regard to the admissible value range may also be performed with regard to the arrangement criterion. If a sufficient correspondence of the actual sensor-component-arrangement with the admissible value range and/or with the arrangement criteria can be conceived, manufacturing the measurement channel with the sensor components arranged therein may be performed.

In FIG. 6 it is indicated that, after the redefinition of the arrangement of the sensor component 6, a redefinition of the arrangement of one or more further sensor components 8, 9 is performed. In an exemplary embodiment, the redefinition of the arrangement of the further sensor components 8 may be made with an admissible value range and/or on the basis of arrangement criteria as a target value, corresponding to the aforementioned. The of the further sensor component 9 may undergo a corresponding redefinition of its desired arrangement. The theoretical redefinition of the desired-sensor-component-arrangement of one or more of the desired-sensor-component-arrangements; or the redefinition of arrangement parameters of the sensor array comprising several sensor components (for example of the sensors 6, 8 and 9) may be performed iteratively in several subsequent steps and possibly multiple repeating loops.

FIG. 7a shows a sensor component 6 arranged in the channel wall 3 of the measuring channel with regard to an admissible value range, according to an exemplary embodiment. The complete sensor component 6 including the front face effective area 61 is situated with respect to the interior channel side 4 offset outwardly into the channel wall 3. The flow of the processing fluid in of the measuring channel 11 is not disturbed by the sensor component 6 arranged as indicated in FIG. 7a, FIG. 7b shows a falsely positioned sensor component 6' according to an exemplary embodiment.

The effective surface 61 thereof pierces the contour 4 of the flow channel and projects into the inside of the measuring channel 1. On the projecting edge 64' of the falsely positioned sensor component 6', disruptive flow occurrences may arise which may significantly impair the measurement precision.

A further sensor component 6" lying outside of an admissible value range is shown in FIG. 7c. The falsely arranged sensor component 6" is offset in the axial direction with regard to its normal vector N in relation to the contour 4 so far that the theoretical beam part of the signal path $P_A$, $P_E$ collides with the channel wall 3 such that the practical beam path would be interrupted thereby. For the falsely positioned sensor component 6", new measurements may take place. Consequently, the admissible value range is also defined with regard to a maximal distance of the effective area of the sensor component with regard to the inner contour 4 of an actual geometry of the measuring channel 1.

The course of an embodiment of the process according to the disclosure may comprise that a desired-sensor-array-arrangement associated with the desired geometry of the measuring channel is provided. The desired sensor-array-arrangement may comprise spatially defined positioning parameters and orienting parameters regarding the sensor components: for example, on the basis of to coordinate points in a Cartesian coordinate system, the orienting parameters of the first active sensor component 59 may be provided, wherein, as positioning parameter of the first active sensor component, it may be at least partially predetermined in that the first active sensor component 59 lies on a straight-line according to the orientation, through both of the coordinate points. On the basis of the two further coordinate-point-pairs, predefined desired positioning parameters and desired orienting parameters may be provided in the Cartesian coordinate system comprising two passive sensor components 53, 57 of the sensor array.

In particular, the control valve housing may be held, stationarily together with the measuring channel, so that the control direction (translational movement direction of the valve member 109; cf. FIG. 1) of the control valve housing is arranged in correspondence with the first axis, for example a Y-axis, of the Cartesian coordinate system of desired-arrangement-parameters of the at least one sensor array 50, 70. Alternatively or additionally, the control valve housing may be held stationarily together with the measuring channel such that the axis of the housing (through the center point of the processing fluid entry 103 and/or of the processing fluid exit 105) is arranged in corresponding to a second axis, for example an X-axis, other Cartesian coordinate system of the at least one sensor array 50, 70.

In this embodiment of a process according to the disclosure, it may at first be examined for the first passive sensor component where the desired arrangement in relation to the actual geometry of the measuring channel 1 lies within an admissible value range. Therefore, as described above with regard to FIG. 4a, the actual geometry of the desired position of the sensor component 53 may be determined with an exemplarily mechanical probe. According to a comparison with the theoretical data of the desired arrangement of the sensor component 53, the desired arrangement of the sensor component 53 may be redefined according to an arrangement criterion, for example according to a desired distance from the effective surface 61 of the sensor component 53 to the inner channel side $4_I$.

Subsequently, the actual geometry at the desired position of the first passive sensor component 57 may be determined with a mechanical measuring probe for example. In the present processing example it shall be assumed that the next passive sensor component 57 is formed by a reflection plane or mirror surface which is formed as a plane section of the interior channel surface 4. The reflection plane may for example be manufactured by milling and/or polishing a section of the channel wall 3 along the interior channel side 4. In this embodiment, when determining the actual geometry of the interior channel surface 4, simultaneously, the actual arrangement parameters of the sensor component 57 are captured. These are to be considered for the present process example as an arrangement criterion which must not be redefined. Rather, other positioning parameters and/or orienting parameters are to be redefined under consideration of the actual positioning parameter of the sensor component 57 insofar as these other arrangement parameters do not fall within the respective admissible range. According to an alternative process it is also conceivable that, during the course of the process, predefined sensor-component-arrangement-parameters are to be considered as mandatory actual arrangement parameters for the further process.

With regard to the actual arrangement parameters of the sensor component 57, in the present exemplary embodiment, afterwards, the orienting parameter and possibly the positioning parameter of the first passive sensor component 53 may be revisited on the basis of predetermined arrangement criteria. In case one or more arrangement criteria, for example the reflection rule, do not lie within an admissible value range under consideration of the actual arrangement parameters of the further sensor component 57, the desired arrangement parameters of the sensor component 53 shall be re-determined based on the arrangement criterion at least in part (possibly once or several times).

In the present exemplary process, afterwards, in any arbitrary sequence, on the basis of the beam path after detecting the actual arrangement parameter of the sensor component 57 and after the redefinition of the desired arrangement parameter of the sensor component 53, the desired positioning parameters of the first active sensor component 59 and of the second sensor component 51 are examined and possibly redefined along a beam path. Thereby, also the desired orienting parameters of the second active sensor component 51 shall be redefined.

The features described in the above description, the figures and the claims may be relevant for realizing the disclosure in the different embodiments thereof both individually as well as in any combination thereof.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 measuring channel
3 channel wall
4 inner channel surface
$4_I$ actual contour
$4_S$ desired contour
6 sensor component
8, 9 further sensor component
32 stop
33 outside surface
36 reception
50 first sensor array
51 first active sensor component
53, 57 passive sensor component
59 further active sensor component
61 effective surface
62 shoulder
64 edge
70 second sensor array
71 second passive sensor component
73, 75 passive sensor component
79 second further active sensor component
100 control valve housing
103 processing fluid entry
105 processing fluid exit
107 valve seat
109 valve member
111 actuator
200 control valve
t distance
M centerpoint curve
N effective surface normal vector
$P_{50}$, $P_{70}$, $P_A$, $P_E$ sensor signal beam path
R radial direction
α,ε entry- and exit angle
$β_E$ entry angle
$β_A$ exit angle
Δs translational distance
Δt axial distance

The invention claimed is:

1. A method for spatially arranging at least one sensor array comprising at least two sensor components in a measuring channel, the method comprising: a) providing a predetermined desired geometry of the measuring channel; b) providing a desired sensor-array arrangement associated with the desired geometry of the measuring channel, wherein the desired sensor-array arrangement comprises spatially-defined positioning parameters and orienting parameters in regard to the at least two sensor components; c) capturing an actual geometry of the measuring channel at one or more locations in the measuring channel; d) determining if at least one of the spatially-defined positioning parameters or at least one of the orienting parameters of the desired sensor-array arrangement is outside of an admissible value range in relation to the actual geometry of the measuring channel, wherein, in response to that at least one of the spatially defined positioning parameters or at least one of the orienting parameters is outside of the admissible value range: the at least one of the spatially-defined positioning parameters or the least one of the orienting parameters of the desired-sensor-array arrangement is redetermined so as to be in compliance with the admissible value range, at least one further positioning parameter and/or orienting parameter of the desired-sensor-array arrangement is redetermined based on at least one predefined arrangement criterion, and step d) is subsequently repeated; and e) arranging the at least two sensor components of the sensor array in the measuring channel according to a most-current desired-sensor-array arrangement, wherein step e) includes providing at least one reception for at least one sensor component of the at least two sensor components in a channel wall of the measuring channel, the at least one sensor component being completely positioned within a space-section of the at least one reception limited by a radial thickness of the channel wall of the measuring channel.

2. The method according to claim 1, wherein the measuring channel is a curved measuring channel, the measuring channel being held stationary at least during the steps c) to e).

3. The method according to claim 2, wherein step c) comprises optically and/or mechanically scanning the actual geometry of the measuring channel.

4. The method according to claim 3, wherein step c) comprises, capturing the spatially-defined positioning parameters and/or the orienting parameters of a reflection plane formed as a section of an inner channel surface, the reflection plane being a passive sensor component of the at least two sensor components.

5. The method according to claim 1, wherein the at least one reception is formed with an axial stop for the at least one sensor component.

6. The method according to claim 1, wherein:
step d) comprises, redetermining a first positioning parameter of the spatially-defined positioning parameters according to a translational shift in an axial direction of one of the at least two sensor components; and a predetermined desired axial distance of an effective surface of the one of the at least two sensor components is considered in relation to an inner channel surface.

7. The method according to claim 1, wherein a first orienting parameter of the orienting parameters is redetermined according to a rotational turn of a first sensor component of the at least two sensor components around a first positioning parameter, of the spatially-defined positioning parameters, of the first sensor component.

8. The method according to claim 7, wherein the redetermining of the first positioning parameter and/or of the first orienting parameter of the first sensor component is defined according to a beam path from a center point of an effective surface of a further sensor component to a second effective surface of the further sensor component and/or according to a predefined desired axial distance of the first effective surface of the first sensor component in relation to an inner channel surface of the measuring channel.

9. The method according to claim 7, wherein the first sensor component is a passive sensor component.

10. The method according to claim 1, wherein step d) comprises redetermining the at least one further positioning parameter based on a translational shift in an axial direction of a further sensor component.

11. The method according to claim 10, wherein the further sensor component is an active sensor component.

12. The method according to claim 1, wherein:
none of the sensor components in an inner channel surface of the measuring channel are formed as a section of the inner channel surface of the measuring channel;
the at least two sensor components are arranged within a channel wall of the measuring channel are formed as the section of the inner channel surface of the measuring channel; or
a passive sensor component of the at least two sensor components are formed as the section of the inner channel surface of the measuring channel.

13. The method according to claim 1, wherein:
during a first determination period, the determination according to step d) is performed in regard to at least one passive sensor component of the at least two sensor components, and subsequently, during a second determination period, the determination according to step d) is performed with regard to an active sensor component of the at least two sensor components, and
in the second determination period, the determination according to step d) is performed at first regarding a first of at least two active sensor components and thereafter in regard to a second of at least two active sensor components.

14. A measuring channel for a processing fluid of the processing plant, such as a power plant, a petrochemical plant, a foodstuff processing plant or the like, the measuring channel having a cylinder-sleeve-shaped channel wall, comprising:
a cylinder-sleeve-shaped channel wall formed as a cast body and/or having manufacturing tolerances of 1 mm or more; and
at least one active sensor component configured to determine a measurement of the processing fluid, the at least one active sensor component being attached to the channel wall with a positioning tolerance of less than ±0.5 mm, and/or with a positioning tolerance of less than the manufacturing tolerance of the measuring channel, wherein the measuring channel is manufactured according to the method of claim 1.

15. The measuring channel according to claim 14, wherein:
the measuring channel comprises at least one sensor array of interacting sensor components, the at least one sensor array including the at least one active sensor component and at least one further active or passive sensor component,
the at least one active sensor component comprises an effective surface,
the at least one further sensor component has a further, active or passive effective surface, the further effective surface and the active surface being arranged in relation to one another with an angular tolerance of ±1° or less,
the at least one sensor array comprises a further active sensor component and at least one further passive sensor component,
all further effective surfaces are arranged in relation to the active effective surface with an angular tolerance of ±2° or less, and
all sensor components of the at least one sensor array are attached to the channel wall with a positioning tolerance of less than ±0.5 mm, and/or with a positioning tolerance of less than a cast manufacturing tolerance of the measuring channel.

16. The measuring channel according to claim 15, wherein:
the measuring channel comprises at least one second sensor array of interacting sensor components, the at least one second sensor array including at least one second active sensor component and at least one second further active or passive sensor component,
the at least one sensor array is arranged relative to the at least one second sensor array with a positioning tolerance of ±0.5 mm or less, and/or with a positioning tolerance of less than the cast manufacturing tolerance of the measuring channel, and
a passive sensor component of the at least one sensor array and a passive sensor component of the at least one second sensor array are identical.

17. The measuring channel according to claim 14, wherein the active sensor component is an ultrasonic emitter, ultrasonic receiver, or ultrasonic transducer.

18. The measuring channel according to claim 14, wherein the measurement of the processing fluid is a flow velocity, a density, or a mass flow.

19. The measuring channel according to claim 15, wherein the passive sensor component is a reflector.

20. The measuring channel according to claim 14, wherein the at least one sensor component is an ultrasonic sensor component.

21. The measuring channel according to claim 15, wherein:
the channel wall defines a channel inner side facing the process fluid, the passive sensor component including a passive effective surface formed as part of the channel inner side, and/or
the measuring channel comprises a cylindrical sensor receptacle that penetrates the channel wall, the at least one active sensor component at and/or the at least one further active or passive sensor component being arranged in the sensor receptacle and the at least one further active or passive sensor component having an active or passive effective surface arranged completely outside the channel inner side.

22. A control valve housing for a control valve of a process plant, the control valve comprising:
- a process fluid inlet,
- a process fluid outlet, and
- a closable valve seat arranged between the process fluid inlet and the process fluid outlet, wherein the control valve housing is formed, at least in sections, as a measuring channel according to claim 15.

23. The control valve housing according to claim 22, wherein the measuring channel is arranged at the process fluid inlet and/or at the process fluid outlet.

24. A control valve for adjusting the process fluid flow of the process plant, comprising:
- the control valve housing according to claim 22; and
- a movable valve member for closing the valve seat.

25. The control valve according to claim 24, further comprising:
- a pneumatic, hydraulic, or electric actuator configured to actuate the valve member, and/or
- actuation and/or control electronics configured to control the actuator.

\* \* \* \* \*